United States Patent
Horiuchi et al.

(10) Patent No.: US 9,034,449 B2
(45) Date of Patent: May 19, 2015

(54) ADHESIVE FILM

(75) Inventors: Kouhei Horiuchi, Chikusei (JP); Michio Uruno, Chikusei (JP); Junichi Imaizumi, Chikusei (JP); Seiji Sunohara, Chikusei (JP); Yasushi Numaguchi, Chikusei (JP)

(73) Assignee: HITACHI CHEMICAL COMPANY, LTD (JP)

( * ) Notice: Subject to any disclaimer, the term of this patent is extended or adjusted under 35 U.S.C. 154(b) by 52 days.

(21) Appl. No.: 13/571,792

(22) Filed: Aug. 10, 2012

(65) Prior Publication Data
US 2013/0040093 A1  Feb. 14, 2013

(30) Foreign Application Priority Data

Aug. 12, 2011 (JP) .................................. 2011-177039
Jun. 28, 2012 (JP) .................................. 2012-145801

(51) Int. Cl.
| B32B 7/12 | (2006.01) |
| B32B 9/00 | (2006.01) |
| B32B 33/00 | (2006.01) |
| C09J 7/02 | (2006.01) |

(52) U.S. Cl.
CPC .......... *C09J 7/0225* (2013.01); *C09J 2201/606* (2013.01); *C09J 2203/318* (2013.01); *C09J 2433/00* (2013.01)

(58) Field of Classification Search
CPC ................. C09J 7/0225; C09J 2433/00; C09J 2203/318; C09J 2201/606
USPC .............. 428/40.1, 41.8, 42.1, 121, 192, 202, 428/352, 354, 906
See application file for complete search history.

(56) References Cited

U.S. PATENT DOCUMENTS

| 2009/0186181 A1* | 7/2009 | Mase ........................ 428/40.1 |
| 2009/0258176 A1* | 10/2009 | Muta et al. ................ 428/41.5 |
| 2011/0293870 A1* | 12/2011 | Lin et al. ................... 428/41.8 |
| 2012/0076967 A1* | 3/2012 | Muramatsu ................ 428/41.8 |

FOREIGN PATENT DOCUMENTS

| CN | 101484313 A | 7/2009 |
| DE | 102004041784 A1 * | 3/2006 |
| JP | 2008-83491 | 4/2008 |

OTHER PUBLICATIONS

Office Action in CN 201210298934.9, dated Jan. 26, 2015 (in Chinese, 6 pgs.).

* cited by examiner

*Primary Examiner* — Patricia L Nordmeyer
(74) *Attorney, Agent, or Firm* — Fitch, Even, Tabin & Flannery

(57) ABSTRACT

The adhesive film includes a film-like adhesive layer, a light release separator and a heavy release separator that are laminated on either side of the adhesive layer, and a carrier film further laminated on the heavy release separator. The outer edges of the light release separator and the carrier film forming the outer layer extend outward beyond the outer edge of the adhesive layer and the heavy release separator forming the inner layer. The outer edge sections of the adhesive layer are thereby protected. The outer edge section of the carrier film is gripped and released first, after which the outer edge section of the light release separator is gripped and released, and finally the heavy release separator is released, thereby allowing each separator and the carrier film to be reliably and easily released in the prescribed order.

9 Claims, 15 Drawing Sheets

ADHESIVE FILM

BACKGROUND OF THE INVENTION

1. Field of the Invention

The present invention relates to an adhesive film.

2. Related Background Art

In recent years, touch panels are being incorporated in the liquid crystal display devices of cellular phones, portable gaming devices, digital cameras, car navigation systems, handheld computers, portable data terminals (PDA) and the like. Such liquid crystal display devices (hereunder also referred to as "touch panel displays") are constructed in a layered manner, with a protective panel, touch panel and liquid crystal panel in that order, there being disposed transparent adhesive films between the protective panel and touch panel and between the touch panel and liquid crystal panel (see PTL 1, for example). Because such adhesive films help increase the brightness and visibility of the display while also functioning as a shock absorption material, they are indispensable components of the display structure.

[PTL 1] Japanese Unexamined Patent Application Publication No. 2008-83491

SUMMARY OF THE INVENTION

The adhesive films mentioned above are generally handled in a three-layer structure form, with both sides of the adhesive layer sandwiched between releasable base material layers. An adhesive film of this type is produced by coating a liquid adhesive composition onto one of the base material layers, irradiating it with active light rays such as ultraviolet rays if necessary to induce semi-curing or curing and form an adhesive layer, and then layering the other base material layer on the adhesive layer. The adhesive layer is preferably formed beforehand to the size of the liquid crystal display device in which it is intended to be used. However, it is difficult to coat adhesive layers to prescribed sizes. It is therefore effective to use a blade or other tool to cut out the adhesive layer formed on the base material layer during the process of producing the adhesive film, so that the adhesive layer can be obtained in the desired shape. Yet, adhesive films formed in such a manner are considered to be responsible for releasability problems of base material layers from the adhesive layer. An example of the releasability problems is such that the adhesive layer is pulled toward the first base material layer during release of the first base material layer from the adhesive layer, causing it to be peeled from the other base material layer. This problem can be occur even in case where, the design is such that, in order to allow release of first one base material layer and then the other base material layer, the peel strength between the first base material layer and the adhesive layer is made to be lower than the peel strength between the other base material layer and the adhesive layer.

Being the result of much effort toward finding a solution, to this problem, the invention provides an adhesive film that protects the adhesive layer while facilitating reliable release of each base material layer in order, without releasability problems.

The adhesive film of the invention comprises a film-like adhesive layer, first and second base material layers laminated in a manner sandwiching the adhesive layer, and a carrier layer further laminated on the second base material layer, wherein the outer edges of the first base material layer and the carrier layer constituting the outer layer extend outward beyond the outer edges of the adhesive layer and the second base material layer constituting the inner layer.

In this type of adhesive film, the outer edges of the first base material layer and carrier layer, which constitute the outer layer, extend outward beyond the outer edges of the adhesive layer and the second base material layer, which constitute the inner layer. This reliably protects the outer edges of the adhesive layer during storage and transport of the adhesive film. When the adhesive layer is to be attached to an, adherend, the outer edge section of the carrier layer that is extended outward may be gripped for easy release of the carrier layer. The outer edge section of the first base material layer may then be gripped for easy release of the first base material layer. Since the second base material layer thus remains on one side of the adhesive layer, protection of the adhesive layer is maintained by the second base material layer when one side of the adhesive layer is to be attached to an adherend. The second base material layer may then be subsequently released and the other side of the adhesive layer attached to a different adherend so that the adhesive layer is disposed between the pair of adherends.

The outer edge of the second base material layer is preferably flush with the outer edge of the adhesive layer. Since this will accentuate the difference in releasability between the first base material layer and the second base material layer, it will be possible to more easily release the first base material layer before releasing the second base material layer. Furthermore, if the outer edge of the second base material layer is aligned with the outer edge of the adhesive layer, the outer edge of the adhesive layer will become more distinct, thus facilitating positioning of the adhesive layer with the adherend.

The outer edge of the carrier layer preferably extends outward beyond the outer edge of the first base material layer. This will further facilitate gripping of the outer edge sections of the carrier layer, allowing the carrier layer to be more easily released.

The peel strength between the first base material layer and the adhesive layer is also preferably lower than the peel strength between the second base material layer and the adhesive layer. This will accentuate the difference in releasability between the first base material layer and the second base material layer, thus making it be possible to more easily release the first base material layer before releasing the second base material layer.

In addition, the peel strength between the second base material layer and the carrier layer is preferably lower than the peel strength between the second base material layer and the adhesive layer. This will accentuate the difference in releasability between the carrier layer and the second base material layer, thus making the carrier layer more easily releasable.

The adhesive film of the invention can protect the adhesive layer while facilitating reliable release of each base material layer in order, without releasability problems.

DESCRIPTION OF THE PREFERRED EMBODIMENTS

Figure 1:
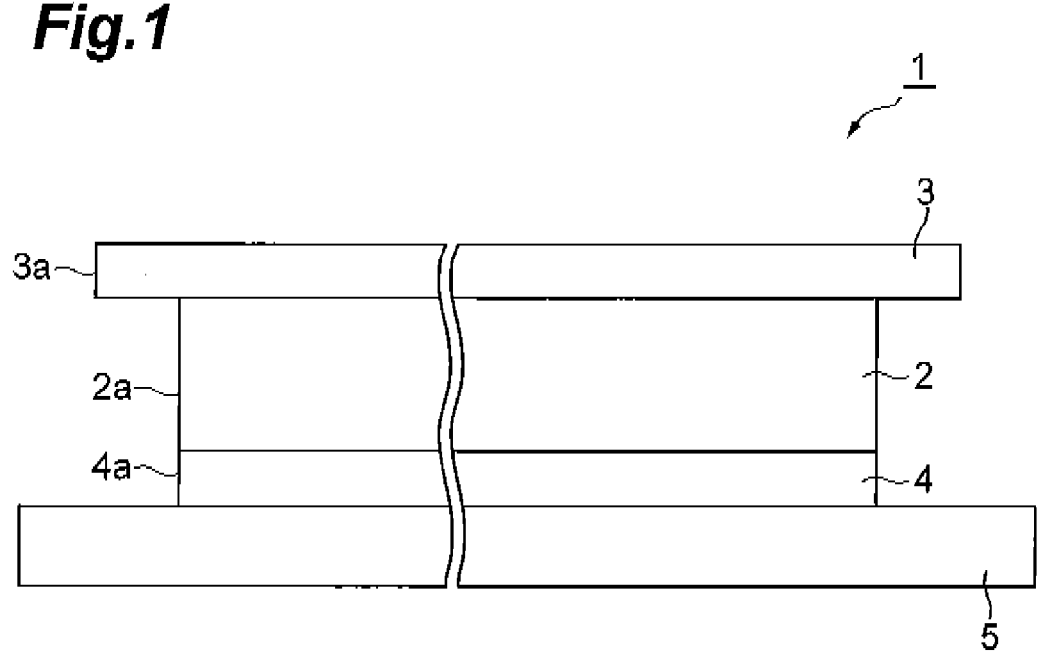
FIG. 1 is a side view of an embodiment of an adhesive film according to the invention.
Figure 2:
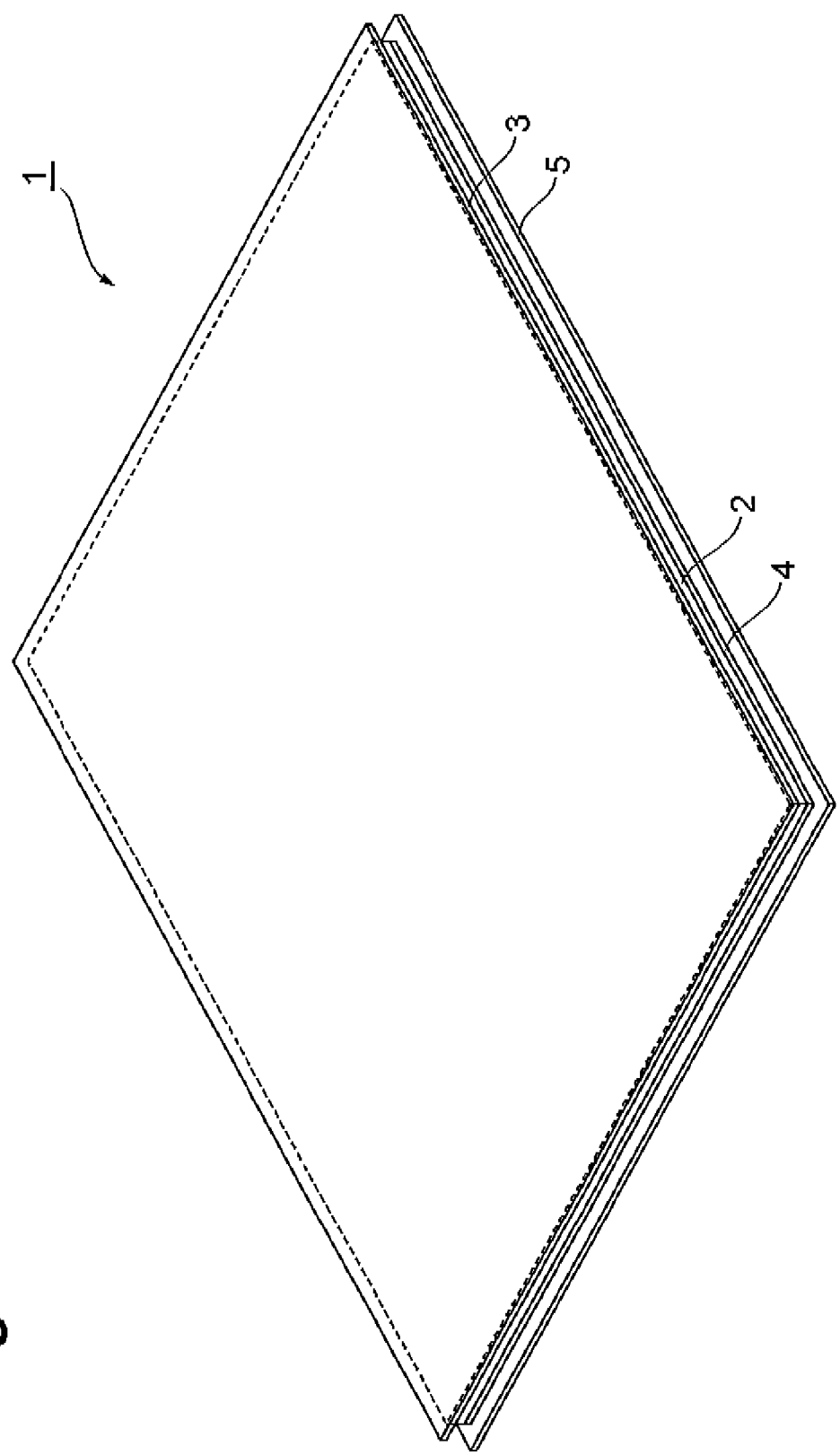
FIG. 2 is a perspective view of an embodiment of an adhesive film according to the invention.

As shown in FIGS. 1 and 2, the adhesive film 1 of the invention comprises a transparent film-like adhesive layer 2, a light release separator 3 (first base material layer) and a heavy release separator 4 (second base material layer) that are laminated on either side of the adhesive layer 2, and a carrier film 5 (carrier layer) further lamidated on the heavy release separator 4. For assembly of a touch panel display for a portable terminal, for example, the adhesive film 1 serves to provide an adhesive layer 2 between a protective panel and a touch panel, and between the touch panel and a liquid crystal panel.

The adhesive layer 2 is formed, for example, by an adhesive composition that includes (A) an acrylic acid-based derivative polymer, (B) an acrylic acid-based derivative and (C) a polymerization initiator. The (A) acrylic acid-based derivative polymer may be obtained by polymerizing the (B) acrylic acid-based derivative, and preferably its weight-average molecular weight is between 10,000 and 1,000,000 (as measured using a calibration curve for standard polystyrene obtained by gel permeation chromatography). The acrylic acid-based derivative polymer may be a polymer obtained by polymerization in combination with a monomer other than an acrylic acid-based derivative. The weight-average molecular weight can be measured using the following apparatus and measuring conditions.

Apparatus: HCL-8320GPC High-speed GPC (detector: differential refractometer or TJV) (Tosoh Corp.)
Solvent: Tetrahydrofuran (THE)
Column: TSKGEL SuperMultipore HZ-H (Tosoh Corp.)
Column size: Column length=15 cm, Inner column diameter: 4.6 mm
Measuring temperature: 40° C.
Flow rate: 0.35 ml/min
Sample concentration: 10 mg/5 mL THF
/Injection rate: 20 µl The (B) acrylic acid-based derivative may be acrylic acid or methacrylic acid, or any of their derivatives. Specifically, these include (meth)acrylic acid all having C1-20 alkyl, benzyl(meth)acrylate, alkoxyalkyl (meth)acrylates, aminoalkyl (meth)acrylates, (meth)acrylic acid esters of (diethyleneglycol ethyl ether), (meth)acrylic acid esters of polyethyleneglycol alkyl ethers, (meth)acrylic acid esters of polyalkyleneglycol aryl ethers, (meth)acrylic acid esters with alicyclic groups, fluorinated alkyl acrylates, (meth)acrylic acid esters with hydroxyl groups, such as 2-hydroxyethyl methacrylate, 3-hydroxypropyl methacrylate, 4-hydroxybutyl methacrylate, 2-hydroxyethyl acrylate, 3-hydroxypropyl acrylate, 4-hydroxybutyl acrylate, glycerol methacrylate and glycerol acrylate, glycidyl(meth)acrylates, acrylamides, (meth)acryloylmorpholine, and the like, which have one polymerizable unsaturated bond in the molecule. Any of these may be used alone or in mixtures of two or more.

A monomer with 2 or more polymerizable unsaturated bonds in the molecule may also be used together with the aforementioned monomers that have one polymerizable unsaturated bond in the molecule. Such monomers include bisphenol A di(meth)acrylate, 1,4-butanediol di(meth)acrylate, 1,3-butyleneglycol di(meth)acrylate, diethyleneglycol di(meth)acrylate, glycerol di(meth)acrylate, neopentyl glycol di(meth)acrylate, polyethyleneglycol di(meth)acrylate, polypropyleneglycol di(meth)acrylate, tetraethyleneglycol dimethacrylate, trimethylolpropane trimethacrylate, pentaerythritol tri(meth)acrylate, tris((meth)acryloxyethyl)isocyanurate, pentaerythritol tetra(meth)acrylate, dipentaerythritol tetra(meth)acrylate, dipentaerythritol hexa(meth)acrylate, dipentaerythritol penta(meth)acrylate, and di(meth)acrylates with urethane bonds. These monomers may also be used alone or in combinations of two or more. From the viewpoint of shapeability of the adhesive layer 2, it is preferred to use a monomer with 2 or more polymerizable unsaturated bonds in the molecule in component (B).

The term "(meth)acrylate" refers to the "acrylate" and its corresponding "methacrylate". Similarly, the term "(meth)acrylic" refers to the "acrylic" and its corresponding "methacrylic" compound, and "(meth)acryloyl" refers to the "acryloyl" and its corresponding "methaciyloyl" compound.

The (C) polymerization initiator may employ a photopolymerization initiator, which may be selected from among known materials such as ketone-based, acetophenone-based, benzophenone-based, anthraquinone-based, benzoin-based, acylphosphine oxide-based, sulfonium salt, diazonium salt and onium salt compounds. Particularly preferred are ketone-based compounds such as 1-hydroxycyclohexylphenyl ketone, and acylphosphine oxide-based compounds such as bis(2,4,6-trimethylbenzoyl)-phenylphosphine oxide, bis(2,6-dimethoxybenzoyl)-2,4,4-trimethyl-pentylphosphine oxide and 2,4,6-trimethylbenzoyl-diphenylphosphine oxide, from the viewpoint of transparency and curing properties.

The content of component (A) is preferably 15-80 wt %, more preferably 15-60 wt % and even more preferably 1.5-50 wt % with respect to the total weight of the adhesive composition. The content of component (B) is preferably 15-80 wt %, more preferably 30-80 wt % and even more preferably 40-80 wt % with respect to the total weight of the adhesive composition. If the contents of component (A) and component (B) are within these ranges, the viscosity of the adhesive composition will be within the proper viscosity range for formation of the adhesive layer, and the moldability will be satisfactory. The adhesion and transparency of the adhesive layer 2 will also be improved. The content of component (C) is preferably 0.05-5 wt %, more preferably 0.1-3 wt % and even more preferably 0.1-0.5 wt % with respect to the total weight of the adhesive composition. By limiting the content of component (C) to no greater than 5 wt % it is possible to increase the light transmittance of the adhesive composition and avoid its yellowing, to obtain a superior adhesive layer 2.

The adhesive layer 2 is obtained by, for example, coating a liquid adhesive composition comprising components (A) to (C) on a heavy release separator 4 to a desired film thickness, irradiating it with an active energy beam for curing, and then shaping it by cutting to the desired size. From the viewpoint of adhesion, the adhesive layer 2 is preferably composed mainly of a structural unit derived from a (meth)acrylic acid alkyl having C4-18 alkyl. Here, "composed mainly of" refers to the most abundant component constituting the adhesive layer 2. The coated adhesive composition may be irradiated with active light rays such as ultraviolet rays. The thickness of the adhesive layer 2 is preferably between 0.1 mm and 1 mm, and more preferably between 0.15 mm (150 μm) and 0.5 mm (500 μm). With this range of thickness, the adhesive layer 2 will be able to exhibit an even more superior effect when applied in a display.

The storage elastic modulus of the adhesive layer 2 at 25° C. is preferably between $1.0 \times 10^3$ Pa and $1.0 \times 10^6$ Pa, and more preferably between $1.0 \times 10^4$ Pa and $5.0 \times 10^5$ Pa.

Figure 15:
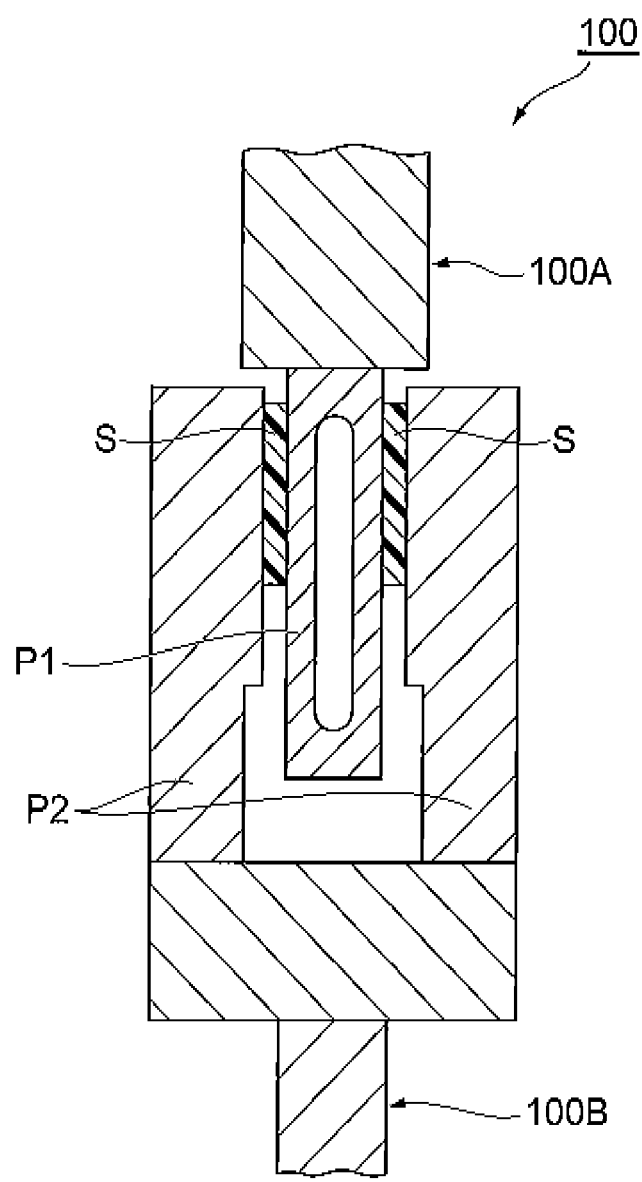
FIG. 15 is a schematic diagram illustrating a method of setting a sample on a macrodynamic viscoelasticity meter.

The storage elastic modulus may be measured as follows. First, two adhesive layers 2 with thicknesses of 250 μm are stacked for a thickness of approximately 500 μm, and the stack is cut into a 10 mm square to form a sample S. Two samples S are prepared and set on a macrodynamic viscoelasticity meter by means of a jig 100. As shown in FIG. 15, the jig 100 comprises a pair of mounting jigs 100A, 100B that are mounted on the macrodynamic viscoelasticity meter so as to face each other. The mounting jig 100A is provided with a plate P1 that extends toward the mounting jig 100B. The mounting jig 100B is provided with a pair of plates P2, P2 each facing a side of the plate P1, and extending toward the mounting jig 100A. Each plate P2 is attached to the plate P1 through a sample S. The mounting jigs 100A, 100E are thus moved away from each other by the macrodynamic viscoelasticity meter, and the storage elastic modulus is measured. The macrodynamic viscoelasticity meter used was a Solids Analyzer RSA-II by Rheometric Scientific, and the measuring conditions were shear sandwich mode, 1.0 Hz frequency, with temperature increase at 5° C./min in a measuring temperature range of −20° C. to 100° C.

The peel strength of the adhesive layer 2 for a glass plate is preferably between 5 N/10 mm and 20 N/10 mm, and more preferably between 7 N/10 mm and 15 N/10 mm. The thickness of the adhesive layer 2 is preferably between 100 μm and 500 μm and more preferably between 150 μm and 400 μm. The planar shape of the adhesive layer 2 may be appropriately designed depending on the adherend to which it will be applied, and for example, the effect of the invention will be prominently exhibited with a rectangular shape having long sides between 50 mm and 500 mm and short sides between 30 min and 400 mm, and even more prominently exhibited with a rectangular shape having long sides between 100 min and 300 mm and short sides between 80 mm and 280 mm. The light transmittance of the adhesive layer 2 is preferably at least 80%, more preferably at least 90% and most preferably at least 95% with respect to light rays in the visible light range (wavelength: 380-780 nm). The light transmittance may be measured using a spectrophotometer. As an example, the spectrophotometer may be a Hitachi Model U-3310 spectrophotometer (with integrating sphere). The light transmittance of the adhesive layer 2 can be calculated by using a spectrophotometer to measure the light transmittance of an adhesive layer-attached glass plate, comprising a 500 μm-thick glass plate and the adhesive layer 2 adjusted to a thickness of 175 μm, and subtracting the light transmittance of the glass plate from the light transmittance of the adhesive layer-attached glass plate.

The light release separator 3 may be a polymer film such as polyethylene terephthalate, polypropylene, polyethylene or polyester, and is preferably a polyethylene terephthalate film (PET film). The thickness of the light release separator 3 is preferably between 25 μm and 125 μm, more preferably between 30 μm and 100 μm and most preferably between 40 μm and 75 μm.

The heavy release separator 4 may also be a polymer film such as polyethylene terephthalate, polypropylene, polyethylene or polyester, and is preferably a polyethylene terephthalate film (PET film). The thickness of the heavy release separator 4 is preferably between 50 μm and 150 μm, more preferably between 60 μm and 125 μm and most preferably between 70 μm and 100 μm.

The carrier film 5 may likewise be a polymer film such as polyethylene terephthalate, polypropylene, polyethylene or polyester, and is preferably a polyethylene terephthalate film (PET film). The thickness of the carrier film 5 is preferably between 15 μm and 100 μm, more preferably between 20 μm and 80 μm and most preferably between 20 μm and 50 μm.

The outer edge 4a of the heavy release separator 4 is essentially flush with the outer edge 2a of the adhesive layer 2. The outer edges 3a, 5a of the light release separator 3 and the carrier film 5 extend outward beyond the outer edge 2a of the adhesive layer 2. The outer edge 5a preferably extends outward even beyond the outer edge 3a.

The amount by which the outer edge 3a extends outward beyond the outer edge 2a is preferably between 2 mm and 15 mm and more preferably between 4 mm and 10 mm. The amount by which the outer edge 5a extends outward beyond the outer edge 2a is preferably between 3 mm and 25 mm and more preferably between 5 mm and 20 mm. Preferably, the inequality Q>P is satisfied, where P is the amount by which the outer edge 3a extends outward beyond the outer edge 2a, and Q is the amount by which the outer edge 5a extends outward beyond the outer edge 3a.

The peel strength between the light release separator 3 and the adhesive layer 2 is preferably lower than the peel strength between the heavy release separator 4 and the adhesive layer 2. The peel strength between the carrier film 5 and the heavy release separator 4 is lower than the peel strength between the heavy release separator 4 and the adhesive layer 2. The peel strength between the carrier film 5 and the heavy release separator 4 is even more preferably lower than the peel strength between the light release separator 3 and the adhesive layer 2, but the effect of the invention will not be impaired if it is higher.

The peel strength between the light release separator 3 and the adhesive layer 2 is preferably 0.01 N/25 mm to 0.4 N/25 mm, the peel strength between the heavy release separator 4 and the adhesive layer 2 is preferably 0.3 N/25 mm to 1.5 N/25 mm, and the peel strength between the carrier film 5 and the heavy release separator 4 is preferably 0.005 N/25 mm to 0.3 N/25 mm. Also, the inequalities T>S and T>U are preferably satisfied, where S is the peel strength between the light release separator 3 and the adhesive layer 2, T is the peel strength between the heavy release separator 4 and the adhesive layer 2, and U is the peel strength between the carrier film 5 and the heavy release separator 4. The relationship between S and U may be either S>U or U>S, but S>U is especially preferred.

The peel strength was measured using a TENSILON RTG-1210 Universal Tester by A&D. The measuring conditions were with 90 degree peeling for the peel strength between the light release separator 3 and the adhesive layer 2, the peel strength between the heavy release separator 4 and the adhesive layer 2 and the peel strength between the carrier film 5 and the heavy release separator 4. The peel strength between the glass plate and the adhesive layer 2 was measured with 180 degree peeling.

Since the outer edges 3a, 5a of the light release separator 3 and the carrier film 5 forming the outer layer thus extend outward beyond the outer edges 2a, 4a of the adhesive layer 2 and the heavy release separator 4 forming the inner layer, the outer edge sections of the adhesive layer 2 are reliably protected during storage and transport of the adhesive film 1.

The peel strength between the separators 3,4 and the adhesive layer 2 may be adjusted by surface treatment of the separators 3,4, for example. Surface treatment of the separators 3,4 can be accomplished by release treatment with a silicone-based compound or fluorine-based compound. Also, the peel strength between the carrier film 5 and the heavy release separator 4 may be adjusted by the type and thickness of glue formed between the carrier film 5 and the heavy release separator 4. The type of the glue formed between the carrier film 5 and the heavy release separator 4 may be an acrylic adhesive, for example. The thickness of the glue formed between the carrier film 5 and the heavy release separator 4 is preferably 0.1 to 10 μm and more preferably 1 to 5 μm.

Figure 3:
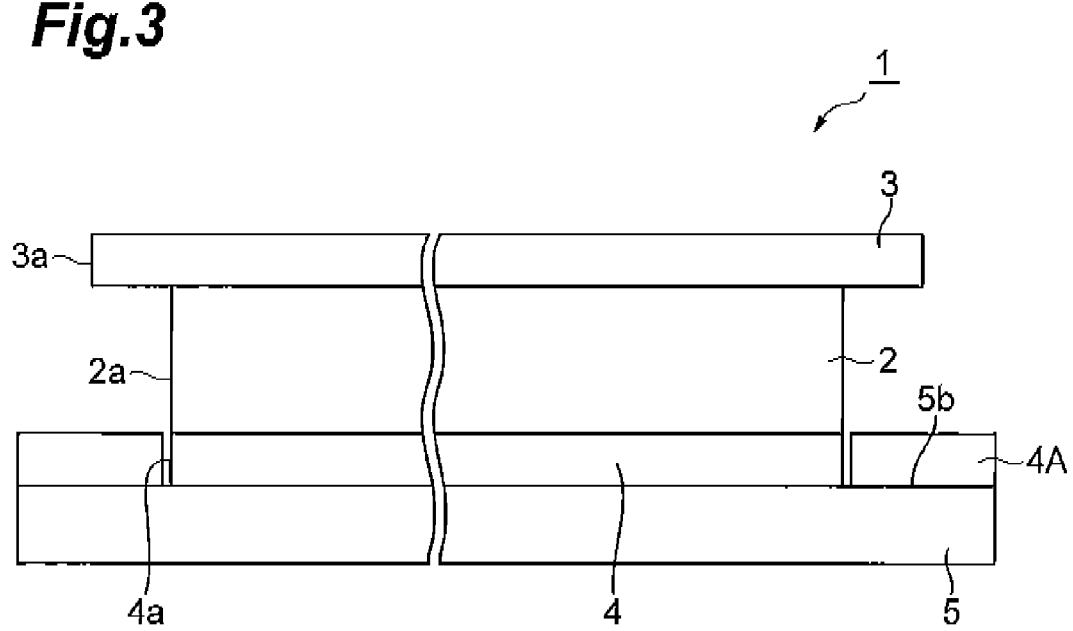
FIG. 3 is a side view of another embodiment of an adhesive film according to the invention.

When the glue is formed over the entire region of the surface 5b on the adhesive layer 2 side of the carrier film 5, the glue will be exposed at an outer side of the outer edge 4a of the heavy release separator 4. In this case, it is preferred to provide a film 4A covering the surface 5b at the outer side of the outer edge 4a of the heavy release separator 4, as shown in FIG. 3. The film 4A may be made of the same material as the heavy release separator 4, for example. Providing a film 4A will cover the glue over the entire region of the surface 5b, thus effectively preventing the exposed glue from becoming attached to other sections, or foreign matter from becoming attached to the exposed glue, so that the usability of the adhesive film 1 can be improved.

Figure 4:
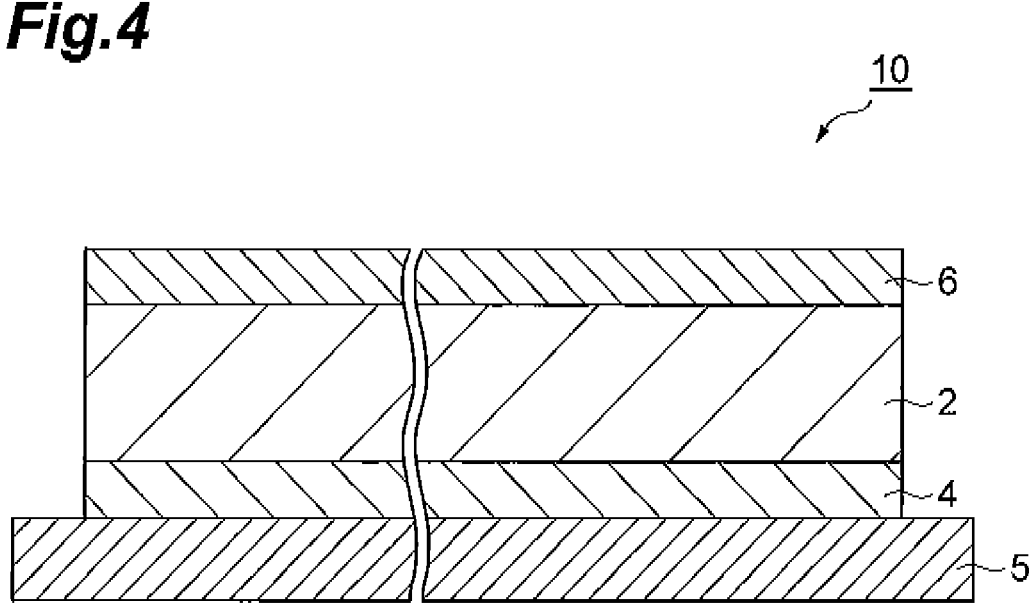
FIG. 4 is a cross-sectional view of a preliminary film.

The adhesive film 1 described above may be produced in the following manner. First, a preliminary film 10 is prepared comprising the heavy release separator 4, the adhesive layer 2 and a temporary separator 6 laminated on the carrier film 5, as shown in FIG. 4. The temporary separator 6 is a layer made of the same material as the light release separator 3, for example.

Figure 5:
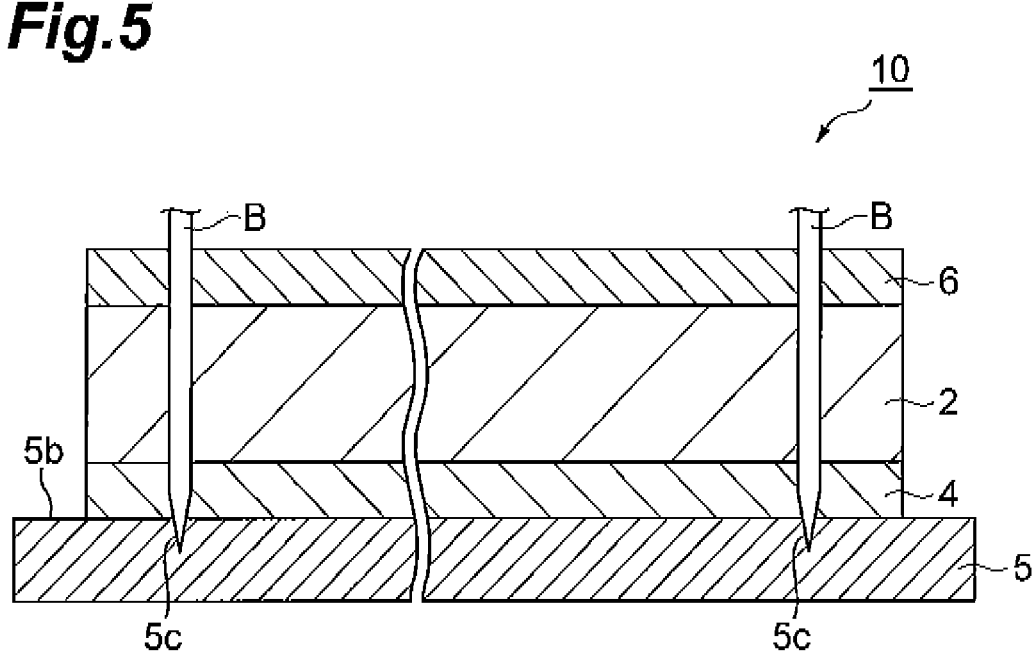
FIG. 5 is a cross-sectional diagram illustrating a cutting step.

Next, a die cutter (not shown) equipped with a blade B is used to cut the temporary separator 6, the adhesive layer 2 and the heavy release separator 4 into the desired shape. The die cutter may be a crank-type die cutter or a rotary-type die cutter. In this step, the blade B is passed through the temporary separator 6, the adhesive layer 2 and the heavy release separator 4 to a depth reaching the carrier film 5, as shown in FIG. 5. This forms a notch 5c on the surface 5b on the adhesive layer 2 side of the carrier film 5. Since the blade B reaches from the temporary separator 6 to the carrier film 5, it is possible to completely cut the adhesive layer 2 and heavy release separator 4. When it is possible to cut the heavy release separator 4 without forming a notch 5c, formation of the notch 5c may be omitted.

Figure 6:
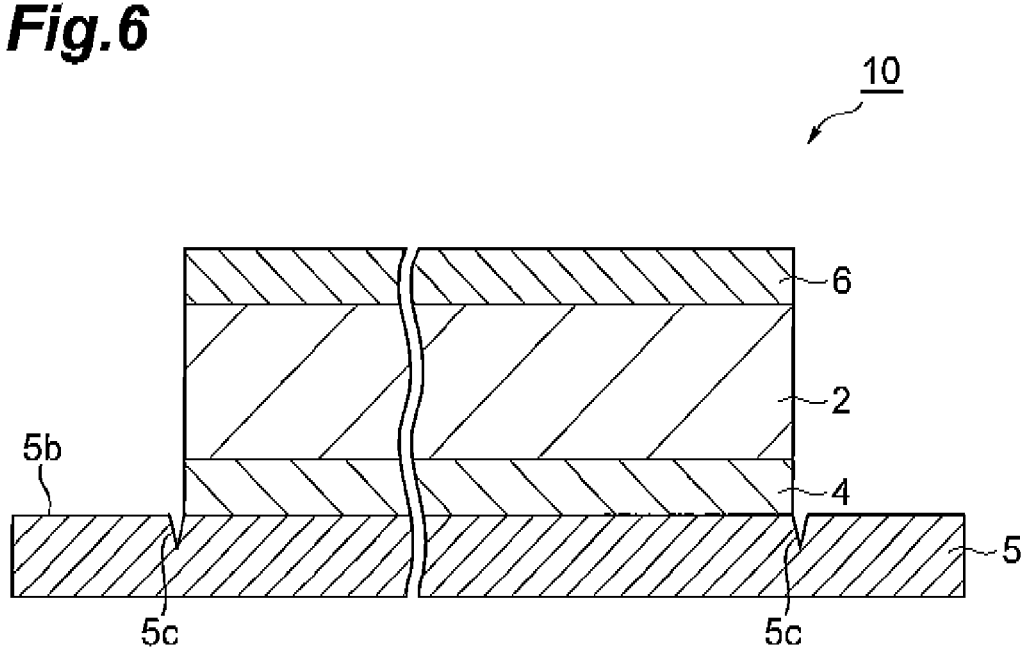
FIG. 6 is a cross-sectional diagram illustrating a removal step.
Figure 7:
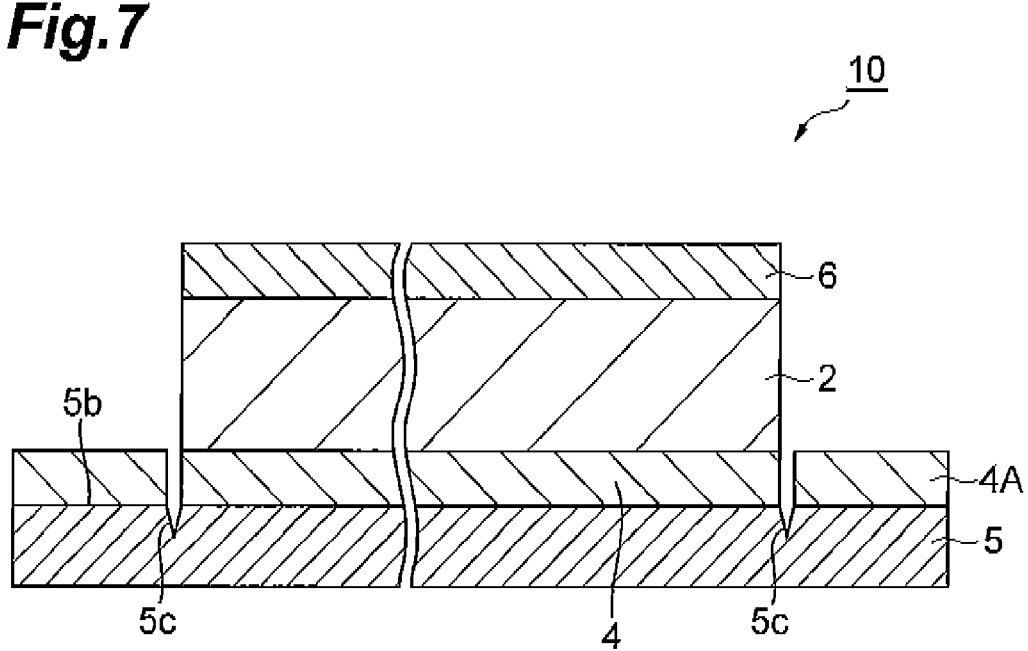
FIG. 7 is a cross-sectional diagram illustrating a removal step.
Figure 8:
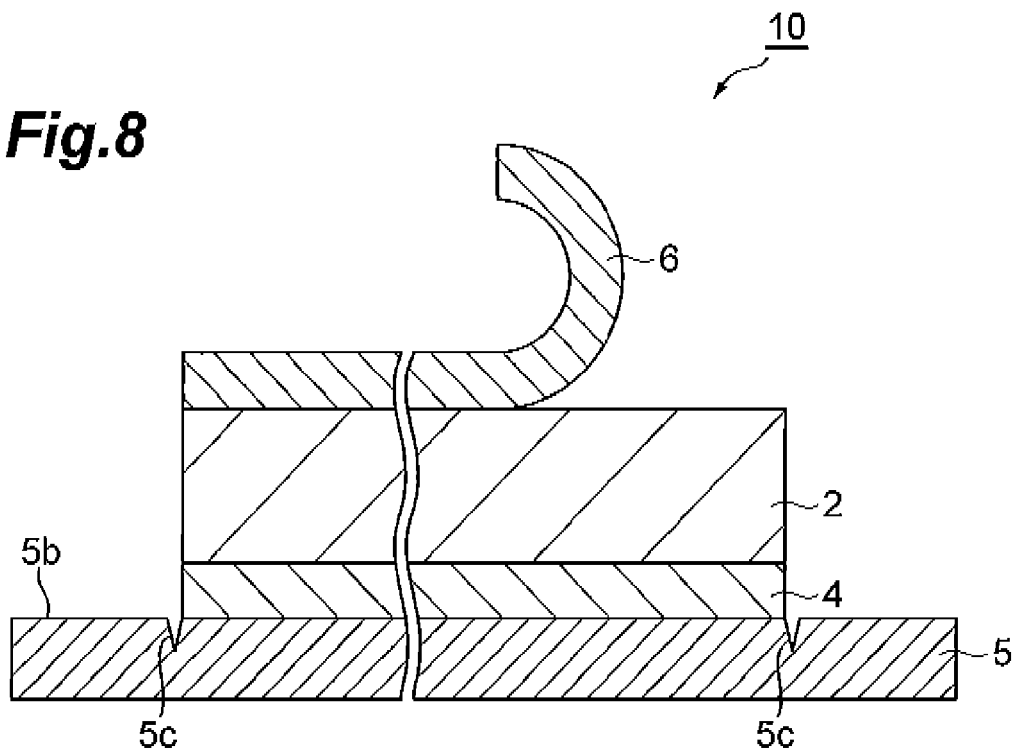
FIG. 8 is a cross-sectional diagram illustrating a removal step.
Figure 9:
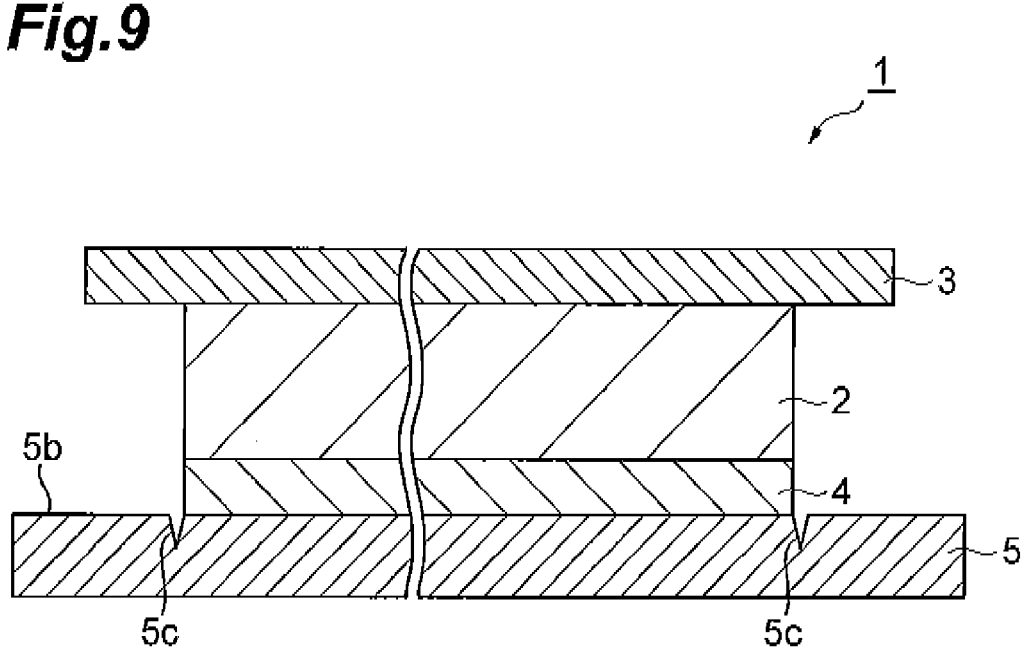
FIG. 9 is a cross-sectional diagram illustrating an attachment step.

Next, the outer sections of the temporary separator 6, adhesive layer 2 and heavy release separator 4 are removed, as shown in FIG. 6. As this is done, the film 4A may be formed by removing only the outer sections of the temporary separator 6 and adhesive layer 2, without removing the outer section of the heavy release separator 4 so that it is left on the carrier film 5, as shown in FIG. 7. Next, the temporary separator 6 is released from the adhesive layer 2, as shown in FIG. 8, and the light release separator 3 is attached to the adhesive layer 2, as shown in FIG. 9. This step completes the adhesive film 1.

Figure 10:
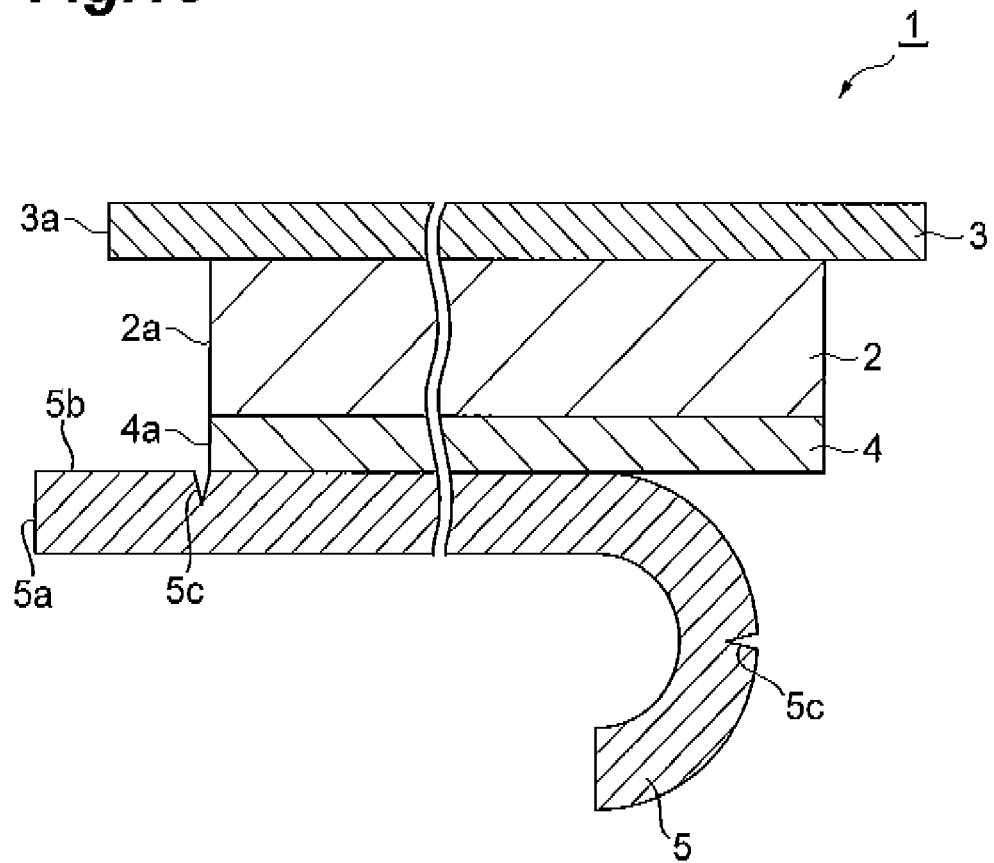
FIG. 10 is a cross-sectional diagram illustrating a carrier film releasing step.

The adhesive film 1 may be used in the following manner for assembly of a display. First, the carrier film 5 is released from the heavy release separator 4, as shown in FIG. 10. The outer edge 5a of the carrier film 5 extends outward beyond the outer edges 2a, 4a of the adhesive layer 2 and the heavy release separator 4, as described above. Thus, the outer edge section of the carrier film 5 that is extended outward may be gripped for easy release of the carrier film 5. The outer edge 5a of the carrier film 5 preferably extends outward beyond the outer edge 3a of the light release separator 3. This will further facilitate gripping of the outer edge sections of the carrier film 5, allowing the carrier film 5 to be more easily released. The peel strength between the carrier film 5 and the heavy release separator 4 is lower than the peel strength between the heavy release separator 4 and the adhesive layer 2. This will accentuate the difference in releasability between the carrier film 5 and the heavy release separator 4, thus making the carrier film 5 more releasable from the heavy release separator 4.

Figure 11:
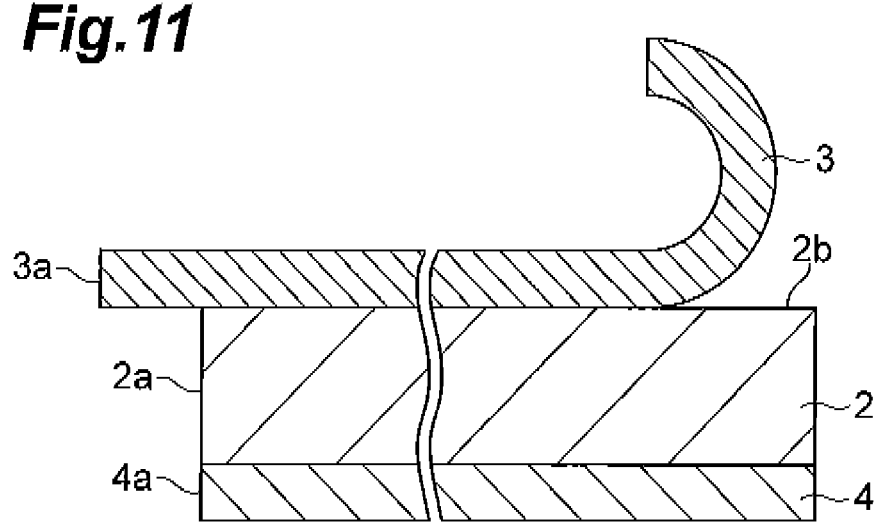
FIG. 11 is a cross-sectional diagram illustrating a light release separator-releasing step.

Next, as shown in FIG. 11, the light release separator 3 is released from the adhesive layer 2 to expose the adhesive side 2b of the adhesive layer 2. As mentioned above, the peel strength between the light release separator 3 and the adhesive layer 2 is lower than the peel strength between the heavy release separator 4 and the adhesive layer 2. In a conventional adhesive film, release often cannot be accomplished as designed even when the peel strengths are different. However, since the outer edge 3a of the light release separator 3 extends outward beyond the outer edges 2a, 4a of the adhesive layer 2 and the heavy release separator 4, the outer edge 3a of the light release separator 3 becomes the outwardmost extended edge after the carrier film 5 has been released. This will render the outer edge 3a of the light release separator 3 more easy to grip than the outer edge 4a of the heavy release separator 4, so that the light release separator 3 will be easier to release than the heavy release separator 4. Therefore, gripping the outer edge section of the light release separator 3 allows the light release separator 3 to be easily released before release of the heavy release separator 4.

In the adhesive film 1, the outer edge 4a of the heavy release separator 4 is essentially flush with the outer edge 2a of the adhesive layer 2. With this construction, the difference in releasability between the light release separator 3 and the heavy release separator 4 will become even more prominent. Therefore, the light release separator 3 can be easily released before release of the heavy release separator 4.

In addition, since the heavy release separator 4 is protected by the carrier film 5 up to the immediately previous step, damage to the surface of the heavy release separator 4 is minimized. This renders damage to the adhesive layer 2 highly visible, so that any damage in the adhesive layer 2 can be easily eliminated before attachment to an adherend.

Figure 12:
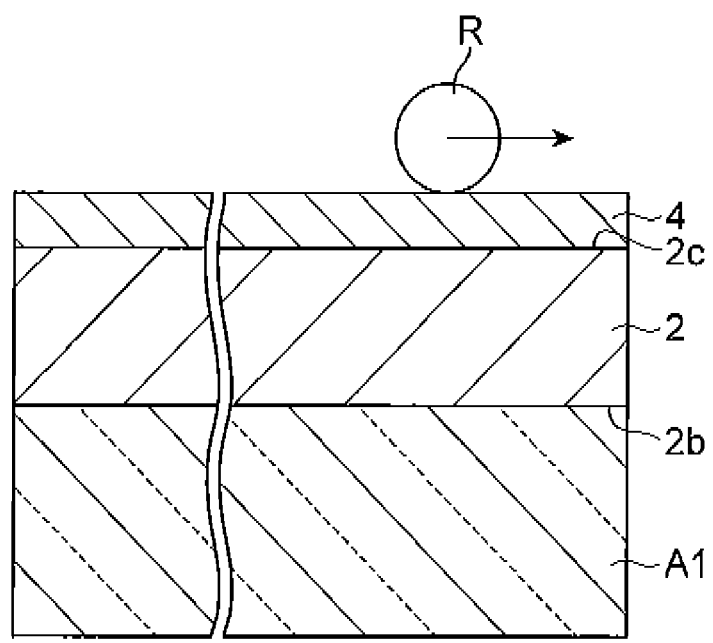
FIG. 12 is a cross-sectional diagram illustrating a step of attachment for a side of an adhesive layer onto an adherend.

Next, as shown in FIG. 12, the adhesive side 2b of the adhesive layer 2 is attached to the adherend A1 and pressed with a roller R, for example. The adherend A1 may be, for example, a liquid crystal panel, a protective panel (glass plate, acrylic resin board, polycarbonate board or the like), or a touch panel. Since the heavy release separator 4 remains on the adhesive side 2c of the adhesive layer 2, protection of the adhesive layer 2 is maintained by the heavy release separator 4 when the adhesive side 2b of the adhesive layer 2 is attached to an adherend A1. In addition, since the outer edge 4a of the heavy release separator 4 and the outer edge 2a of the adhesive layer 2 are aligned, the position of the outer edge 2a of the adhesive layer 2 becomes more definite and positioning between the adhesive layer 2 and adherend A1 is facilitated.

Figure 13:
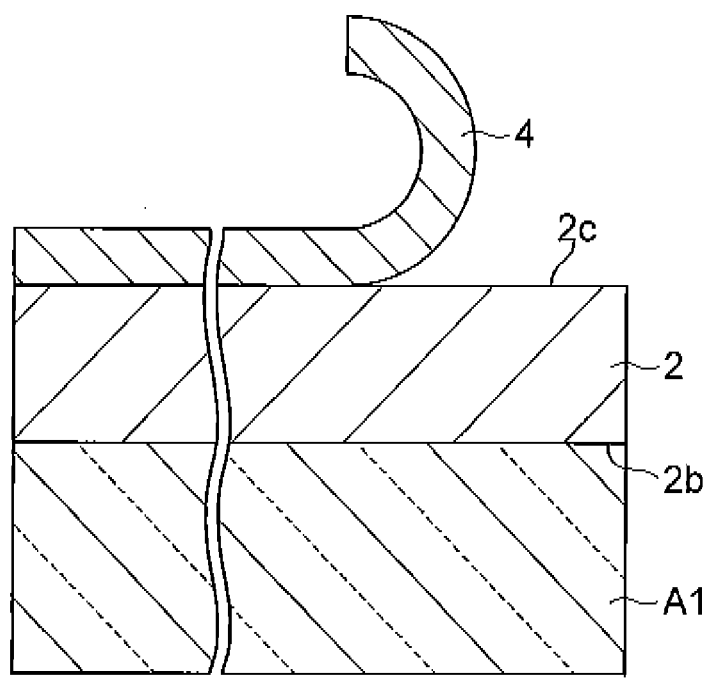
FIG. 13 is a cross-sectional diagram illustrating a heavy release separator-releasing step.
Figure 14:
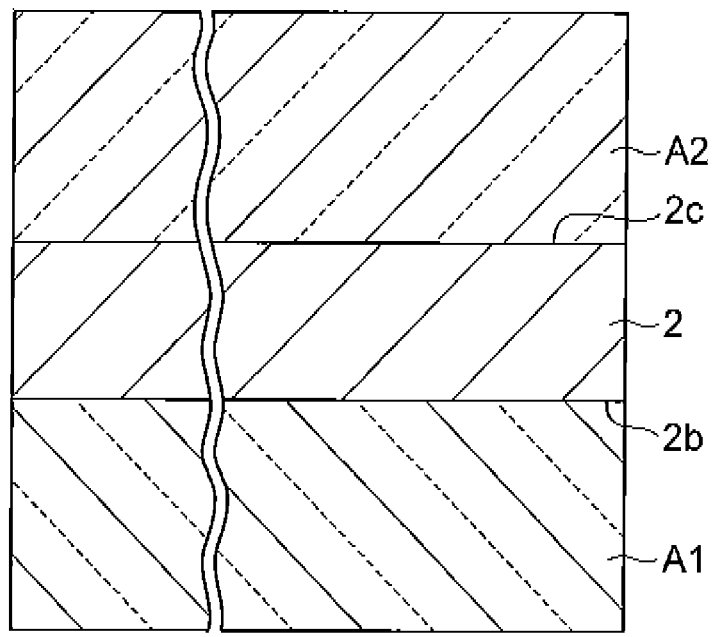
FIG. 14 is a cross-sectional diagram illustrating a step of attachment for a side of an adhesive layer onto an adherend.

Next, as shown in FIG. 13, the heavy release separator 4 is released from the adhesive layer 2 to expose the adhesive side 2c of the adhesive layer 2. Then, as shown in FIG. 14, the adhesive side 2c of the adhesive layer 2 is attached to the adherend A2 and heated and pressed. The adherend A2 may be, for example, a liquid crystal panel, a protective panel or a touch panel. In the steps described above, the adhesive layer 2 is disposed between the adherend A1 and the adherend A2.

Thus, the adhesive film 1 can protect the adhesive layer 2 while facilitating reliable release of each separator 3,4 and the carrier film 5 in the prescribed order, without releasability problems.

The embodiments described above are preferred embodiments of the invention, but the invention is not necessarily limited thereto and may incorporate various modifications within the scope of the gist thereof.

What is claimed is:

1. An adhesive film comprising:
   an adhesive layer configured to be provided between two adherends;
   first and second base material layers sandwiching the adhesive layer, and configured to be released from the adhesive layer before the adhesive layer is provided between the two adherends; and
   a carrier layer on the second base material layer, on a side of the second base material layer opposite a side thereof adjacent the adhesive layer, and configured to be released from the second base material layer before the first and second base material layers are released from the adhesive layer the carrier layer being in direct contact with the second base material layer,
   wherein outer edges of the first base material layer and the carrier layer extend outward beyond outer edges of the adhesive layer and the second base material layer.

2. An adhesive film comprising:
   an adhesive layer configured to be provided between two adherends;
   first and second base material layers laminated in a manner sandwiching the adhesive layer, and configured to be released from the adhesive layer before the adhesive layer is provided between the two adherends; and
   a carrier layer further laminated on the second base material layer, and configured to be released from the second base material layer before the first and second base material layers are released from the adhesive layer, the carrier layer being in direct contact with the second base material layer;
   wherein the first base material layer and the carrier layer are at opposite sides of the adhesive layer, and
   wherein outer edges of the first base material layer and the carrier layer extend outward beyond outer edges of the adhesive layer and the second base material layer.

3. The adhesive film according to claim 2, wherein the outer edge of the second base material layer is essentially flush with the outer edge of the adhesive layer.

4. The adhesive film according to claim 2, wherein the outer edge of the carrier layer extends outward beyond the outer edge of the first base material layer.

5. The adhesive film according to claim 2, wherein the peel strength between the first base material layer and the adhesive layer is lower than the peel strength between the second base material layer and the adhesive layer.

6. The adhesive film according to claim 2, wherein the peel strength between the second base material layer and the carrier layer is lower than the peel strength between the second base material layer and the adhesive layer.

7. The adhesive film according to claim 2, wherein the outer edge of the first base material layer extends outward beyond the outer edge of the adhesive layer between 2 mm and 15 mm.

8. The adhesive film according to claim 2, wherein the outer edge of the carrier layer extends outward beyond the outer edge of the adhesive layer between 3 and 25 mm.

9. An adhesive film comprising layers laminated in the following order:
   a carrier layer;
   a second base material layer on the carrier layer, the carrier layer being in direct contact with the second base material layer;
   an adhesive layer on the second base material layer, the adhesive layer being configured to be provided between two adherends; and
   a first base material layer on the adhesive layer,
   wherein the first and second base material layers are configured to be released from the adhesive layer before the adhesive layer is provided between the two adherends;
   wherein outer edges of the first base material layer and the carrier layer extend outward beyond outer edges of the adhesive layer and the second base material layer, and
   wherein the carrier layer is configured to be released from the second base material layer before the first and second base material layers are released from the adhesive layer.

* * * * *